US007853878B2

(12) United States Patent
Kim (10) Patent No.: US 7,853,878 B2
(45) Date of Patent: Dec. 14, 2010

(54) SYSTEM AND METHOD FOR THE CONTROL OF IMAGE PROCESSING AND STORING DEVICES

(75) Inventor: Dae-gu Kim, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 11/357,128

(22) Filed: Feb. 21, 2006

(65) Prior Publication Data

US 2006/0253778 A1    Nov. 9, 2006

(30) Foreign Application Priority Data

May 4, 2005    (KR) .................... 10-2005-0037646

(51) Int. Cl.
*G06F 3/00* (2006.01)
*H04N 7/173* (2006.01)
*H04N 7/16* (2006.01)
*G06F 3/14* (2006.01)

(52) U.S. Cl. ................... 715/716; 715/700; 715/719; 715/864; 715/965; 725/37; 725/59; 725/86; 725/105; 725/109; 725/110; 725/131; 725/143

(58) Field of Classification Search ................... 715/700
See application file for complete search history.

(56) References Cited

U.S. PATENT DOCUMENTS

| 5,760,774 | A  | * | 6/1998  | Grossman et al. ........... 715/835 |
| 6,311,011 | B1 | * | 10/2001 | Kuroda ........................ 386/46 |
| 6,922,845 | B2 | * | 7/2005  | Yap et al. .................... 725/141 |
| 7,123,813 | B2 | * | 10/2006 | Inoue .......................... 386/46 |
| 2003/0222993 | A1 |  | 12/2003 | Hatano |
| 2004/0141719 | A1 | * | 7/2004  | Hashimoto ................... 386/46 |
| 2004/0187152 | A1 | * | 9/2004  | Francis et al. ................ 725/58 |
| 2005/0005300 | A1 | * | 1/2005  | Putterman et al. ............ 725/89 |
| 2005/0034154 | A1 | * | 2/2005  | Yeh et al. ..................... 725/38 |
| 2005/0120380 | A1 | * | 6/2005  | Wolfe .......................... 725/100 |
| 2005/0198663 | A1 | * | 9/2005  | Chaney et al. ................ 725/38 |
| 2006/0048184 | A1 | * | 3/2006  | Poslinski et al. ............. 725/45 |
| 2006/0075441 | A1 | * | 4/2006  | Gauba et al. ................. 725/89 |
| 2007/0039033 | A1 | * | 2/2007  | Ota ............................. 725/115 |
| 2007/0199038 | A1 | * | 8/2007  | Choi ........................... 725/134 |

FOREIGN PATENT DOCUMENTS

| CN | 1438804 A    | 8/2003 |
| JP | 2000-30366 A | 1/2000 |

(Continued)

*Primary Examiner*—Tadeese Hailu
*Assistant Examiner*—Yongjia Pan
(74) *Attorney, Agent, or Firm*—Sughrue Mion, PLLC (57) ABSTRACT

A method is provided for controlling an image storing system comprising an external storage device including a plurality of storage processors, and an image processing apparatus connected with the external storage device and storing a received video signal in the external storage device. The method includes storing data about operation state of the plurality of storage processors of the image processing apparatus by the image processing apparatus; and generating a user interface menu representing the external storage device as a plurality of storage device items on the basis of the stored data about the operation states of the plurality of storage processors when a storing operation for the video signal is selected.

13 Claims, 8 Drawing Sheets

FOREIGN PATENT DOCUMENTS

| | | |
|---|---|---|
| JP | 2001-8158 A | 1/2001 |
| JP | 2004-165897 A | 6/2004 |
| JP | 2004-222057 A | 8/2004 |
| KR | 0118488 Y1 | 2/1998 |
| KR | 10-2005-0036454 A | 4/2005 |
| WO | WO 01/82598 A2 * | 11/2001 |

* cited by examiner

Recording . . . . . . .

'Current Device' -> 'AV HDD1'

Recording processor stopped
'Current Device' -> 'AV HDD1'

| Ok | Cancel |

SYSTEM AND METHOD FOR THE CONTROL OF IMAGE PROCESSING AND STORING DEVICES

CROSS-REFERENCE TO RELATED APPLICATIONS

This application claims priority from Korean Patent Application No. 2005-0037646, filed May 4, 2005, in the Korean Intellectual Property Office, the disclosure of which is incorporated herein by reference.

BACKGROUND OF THE INVENTION

1. Field of the Invention

The present invention relates to an image processing apparatus, an image storing system comprising the same and a control method thereof, and more particularly, to an image processing apparatus with a user interface (UI) needed for storing a video signal from a video signal source in an external storage device, an image storing system comprising the same and a control method thereof.

2. Description of the Related Art

In a conventional image storing method, a storage device directly performs a storing function. However, a communication technology such as Institute of Electrical and Electronics Engineers (IEEE) 1394, or the like has recently been used in selecting an external storage device connected to an image processing apparatus and performing the storing function.

In particular, two or more external storage devices can be used at the same time in performing a storing function. In the case where the conventional image processing apparatus provides a UI for selecting the external storage device, which only displays whether a corresponding external storage device is connected or not, or only displays a state of a corresponding external storage device as "power on", "standby", "record one", "record two", and the like, where each external storage device is displayed as a single item.

When the UI menu for selecting the external storage device having a plurality of storage processors displays each corresponding external storage device as a single item, it is difficult for a user to directly select the external storage device in order to perform or stop its storing function. In other words, when the external storage device has the plurality of storage processors, because an operation state of each processor is not directly displayed on a UI screen, it is difficult for the user perform a secondary selecting operation to store or stop the storing function.

SUMMARY OF THE INVENTION

Accordingly, it is an aspect of the present invention to provide an image processing apparatus, an image storing system comprising the same and a control method thereof, in which a user can easily select an external storage device in a case where a UI menu for selecting the external storage device having a plurality of storage processors displays each corresponding external storage device as a single item.

According to an aspect of the present invention, there is provided a method of controlling an image storing system comprising an external storage device having a plurality of storage processors, and an image processing apparatus connected with the external storage device and storing a received video signal in the external storage device, the method comprising storing data about operation state of the plurality of storage processors of the image processing apparatus by the image processing apparatus; and generating a UI menu representing the external storage device as a plurality of storage device items on the basis of the stored data about the operation states of the plurality of storage processors when a storing operation for the video signal is selected.

According to an aspect of the present invention, the method further comprises requesting the data from the external storage device when there is no data, and receiving the requested data.

According to an aspect of the present invention, the generating the UI menu for selecting the external storage device comprises representing the external storage device as the storage device items corresponding to the storage processors.

According to an aspect of the present invention, the method further comprises generating a message that the storing operation can be started when the storage device item being on standby is pointed by manipulating a user selection unit, and a message that the storing operation can be stopped when the storage device item performing the storing operation is pointed by manipulating the user selection unit.

According to an aspect of the present invention, the method further comprises starting the storing operation in the case that the storage processor corresponding to the selected storage device item is on standby, and stopping the storing operation in the case that the storage processor corresponding to the selected storage device item performs the storing operation, when the pointed storage device item is selected through the user selection unit.

According to an aspect of the present invention, the generating the UI menu for selecting the external storage device comprises representing the storage processors performing the storing operation as the respective storage device items, and representing the storage processors being on standby as one storage device item on the basis of the data about the operation state.

According to an aspect of the present invention, there is provided a method of controlling an image processing apparatus to store a received video signal in an external storage device having a plurality of storage processors, the method comprising storing data about operation state of the plurality of storage processors; and generating a UI menu used for selecting the external storage device and representing the external storage device as a plurality of storage device items corresponding to the storage processors on the basis of the stored data when a storing operation for the video signal is selected.

According to an aspect of the present invention, the method further comprises requesting the data from the external storage device when there is no data, and receiving the requested data.

According to an aspect of the present invention, there is provided an image processing apparatus comprising a communication unit for communicating to an external storage device having a plurality of storage processors, a video signal processing unit for processing a received video signal, a user selection unit, and storing the video signal in the external storage device, the image processing apparatus further comprising a memory to store data about operation states of the plurality of storage processors; a UI generator to generate a UI menu for selecting the external storage device; and a controller to control the UI generator to generate a UI menu representing the external storage device as a plurality of storage device items on the basis of the data stored in the memory when a storing operation for the video signal is selected through the user selection unit.

According to an aspect of the present invention, the controller controls the UI generator to generate the UI menu representing the external storage device as the storage device items corresponding to the storage processors.

According to an aspect of the present invention, the controller controls the UI generator to generate a message that the storing operation can be started when the storage device item being on standby is pointed by manipulating the user selection unit, and a message that the storing operation can be stopped when the storage device item performing the storing operation is pointed by manipulating the user selection unit.

According to an aspect of the present invention, the controller starts the storing operation in the case that the storage processor corresponding to the selected storage device item is on standby, and stops the storing operation in the case that the storage processor corresponding to the selected storage device item performs the storing operation, when the pointed storage device item is selected through the user selection unit.

According to an aspect of the present invention, the controller controls the UI generator to represent the storage processors performing the storing operation as the respective storage device items, and represent the storage processors being on standby as one storage device item.

According to an aspect of the present invention, the controller starts the storing operation in the case that the storage processor corresponding to the selected storage device item is on standby, and stops the storing operation in the case that the storage processor corresponding to the selected storage device item performs the storing operation, when the pointed storage device item is selected through the user selection unit.

According to an aspect of the present invention, the controller requests the data from the external storage device through the communication unit when the memory stores no data about the operating states of the storage processors.

According to an aspect of the present invention, the communication unit comprises an IEEE 1394 port.

According to an aspect of the present invention, there is provided an image storing system comprising an external storage device having a plurality of storage processors, and an image processing apparatus connected with the external storage device and storing a received video signal in the external storage device, the image processing apparatus comprising a communication unit to communicating to the external storage device, a user selection unit, a video signal processing unit to process the video signal, a memory to store data about operation states of the plurality of storage processors, a UI generator to generate a UI menu for selecting the external storage device; and a controller to control the UI generator to generate a UI menu representing the external storage device as a plurality of storage device items on the basis of the data stored in the memory when a storing operation for the video signal is selected through the user selection unit.

According to an aspect of the present invention, the image processing apparatus further comprises an IEEE 1394 communication cable connecting the external storage device with the communication unit of the image processing apparatus.

BRIEF DESCRIPTION OF THE DRAWINGS

The above and other aspects of the present invention will become apparent and more readily appreciated from the following description of the exemplary embodiments, taken in conjunction with the accompany drawings of which.

DETAILED DESCRIPTION OF EXEMPLARY EMBODIMENTS OF THE INVENTION

Reference will now be made in detail to the exemplary embodiments of the present invention, examples of which are illustrated in the accompanying drawings, wherein like reference numerals refer to like elements throughout. The exemplary embodiments are described below so as to explain the present invention by referring to the figures.

Figure 1:
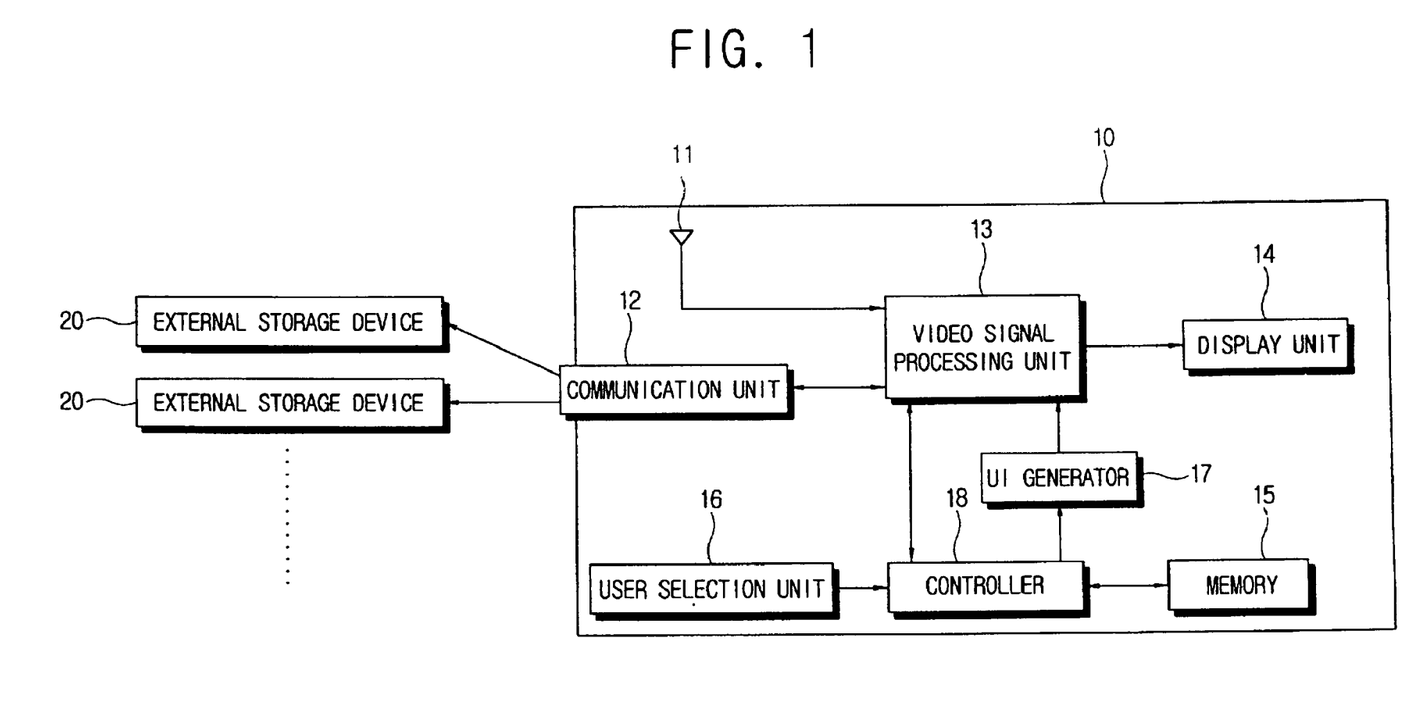
FIG. 1 is a control block diagram of a television and an image storing system including the television according to an exemplary embodiment of the present invention.

FIG. 1 is a control block diagram of a television (TV) 10 as an image processing apparatus and an image storing system including the television according to an exemplary embodiment of the present invention. As shown therein, the image storing system according to an exemplary embodiment of the present invention includes the TV 10, and at least one external storage device 20 connected to the TV 10 and storing a video signal from the TV 10.

In FIG. 1, a plurality of external storage devices 20 are provided, and each includes a plurality of storage processors. Among the external storage devices 20 connected to the TV 10, there may be an external storage device 20 including a single storage processor.

Here, the storage processor is a processor that performs a storing operation, and may include at least one of a hardware processor such as multiprocessor and/or a software processor to execute multiple processes or multiple threads.

The TV 10 according to an exemplary embodiment of the present invention includes an antenna 11, a communication unit 12, a video signal processing unit 13, a display unit 14, a memory 15, a user selection unit 16, a UI generator 17, and a controller 18.

The communication unit 12 includes a first connection port for receiving an external video signal, and a second connection port to which the external storage device 20 is connected. For example, the communication unit 12 may include an analog signal connection port for receiving an analog video signal such as a composite video baseband signal (CVBS), an S-video signal or the like, and a digital signal connection port for receiving a digital video signal such as a digital video interface (DVI) signal or the like.

Further, the digital signal connection port includes an IEEE 1394 port to which the external storage device 20 such as an audio/video (AV) hard disk drive (HDD) is connected. Thus, the TV 10 and the external storage device 20 can transmit a control signal or a command to each other through the IEEE 1394 port.

The video signal processing unit 13 converts a video signal received through the antenna 11 and the communication unit 12 into a video signal which can be processed in the display unit 14. The video signal processing unit 13 may include a tuner for receiving a broadcast signal as a radio frequency (RF) signal from the antenna 11, and a video decoder for decoding an analog video signal such as the CVBS and the S-video signal received from the communication unit 12 and the broadcast signal transmitted from the tuner.

In addition, the video signal processing unit 13 may include a transition minimized differential signaling (TMDS) receiver for dividing a digital video signal such as a DVI signal received through the digital signal connection port into an RGB digital signal and a horizontal/vertical (H/V) sync signal, and an analog-to-digital (A/D) converter for converting an analog video signal such as a component signal and a PC signal into a digital video signal. Also, the video signal processing unit 13 includes a scaler for processing a video signal converted through the video decoder and the A/D converter to be displayable on the display unit 14, and a frame buffer.

Further, the video signal processing unit 13 synthesizes the previously processed video signal and a menu signal corresponding to a user manipulation menu generated through the UI generator 17.

The display unit 14 receives the video signal and the menu signal from the video signal processing unit 13 and displays a picture. The display unit 14 includes a display panel displaying the picture thereon, and a panel driver. The display unit 14 can be achieved by a cathode ray tube (CRT), a liquid crystal display (LCD), a plasma display panel (PDP), and the like.

The memory 15 stores data about an operating state of the storage processor provided in the external storage device 20. Here, the data about the operating state includes data indicating whether the external storage device 20 is turned on or off and whether the storing operation of the storage processor is being implemented or on standby. Further, the data about the operating state includes data indicating whether the external storage device 20 is connected or not to the TV 10. The memory 15 can be an erasable programmable read only memory (EPROM), an electrically erasable programmable read only memory (EEPROM), a register, or the like.

The user selection unit 16 outputs a key signal to the controller 18 in correspondence to manipulation by a user. Here, the user selection unit 16 includes a menu key allowing a user to select a function for storing the video signal; up, down, left and right keys allowing a user to point or select items of a menu; and a key signal generator generating the key signal corresponding to the manipulation by a user. Further, the user selection unit 16 can be achieved by an input unit separately connected to the TV 10, e.g., a mouse, a keyboard, etc. or a remote controller. When a user manipulates a button or a key, the key signal generator generates the key signal corresponding to the manipulation by a user and outputs the key signal to the controller 18. Thus, the controller 18 controls the video signal processing unit 13, the UI generator 17, etc. on the basis of the key signal from the key signal generator.

The UI generator 17 generates a UI menu allowing a user to select the storage device for storing the video signal. As shown in FIG. 1, the UI generator 17 can be provided separately from the video signal processing unit 13, but the present invention is not limited thereto. Alternatively, the UI generator 17 may be included in the video signal processing unit 13.

The UI generator 17 is controlled by the controller 18 to process and generate the menu signal corresponding to the UI menu for selecting the storage device. Thus, the UI generator 17 moves the pointing highlight according to the manipulation of the user selection unit 16, and generates message data corresponding to the pointed or selected storage device item.

When each external storage device 20 includes a plurality of storage processors, the UI menu generated by the UI generator 17 can include a plurality of items corresponding to the respective operation states of the storage processors for one of the external storage devices 20.

For example, when one of the external storage devices 20 has four storage processors, one storage device item is divided into four storage device items. When two among four storage processors performs the storing operation and the other two storage processors are on standby, the two storage processors performing the storing operation are displayed as two storage device items, and the other storage processors which are on standby are displayed as one storage device item.

The UI menu generated by the UI generator 17 can have various designs, and its shape, size, color, brightness, position can be also varied according to pointing or selecting through the user selection unit 16. Here, the menu signal corresponding to a storage device selection menu generated by the UI generator 17 is synthesized with the video signal output from the video signal processing unit 13, and then transmitted to the display unit 14.

Thus, one external storage device 20 is represented as the plurality of storage device items corresponding to the respective operation states of the storage processors of the external storage device 20, so that a user can easily select a desired operation.

Detailed descriptions of the selection menu for the external storage device 20 connected to the TV 10 according to an exemplary embodiment of the present invention will be described later.

The controller 18 controls the UI generator 17 to generate the UI menu including the plurality of storage device items for selecting the external storage device 20 on the basis of the data about the operation states stored in the memory 15 according to the manipulation of the user selection unit 16, thereby displaying the UI menu on the display unit 14. Here, the controller 18 can be achieved by a microcomputer (MICOM) or the like.

Further, the controller 18 outputs a control signal and gives a command to the external storage device 20 so that the external storage device 20 starts or stops storing the broadcast signal or the video signal from an external source selected through the user selection unit 16. The controller 18 requests the data about the operation states of the respective storage processors from the corresponding external storage device 20 periodically or in correspondence to the selection through the user selection unit 16. Also, the controller 18 controls the memory 15 to store the data about the operation states of the respective storage processors transmitted from the external storage device 20.

The controller 18 controls the UI generator 17 to point the storage device items of the UI menu with a pointing highlight according as a user manipulates the up, down, left and right keys through the user selection unit 16. Further, the controller 18 controls the UI generator 17 to generate a message about whether or not the storing operation is possible, or a message asking whether a user wants to stop the storing operation, in correspondence to the operating state of the storage processor according to the pointed storage device item. Also, the controller 18 outputs the control signals to the video signal processing unit 13 and the external storage device 20 so that the storing operation for the video signal is started or stopped on the basis of the operating state of the external storage device 20 selected through the user selection unit 16. In the case where the storing operation for the video signal is started, the controller 18 controls the video signal processing unit 13 to encode the selected video signal in a predetermined format, thereby transmitting the encoded video signal to the external storage device 20 through an IEEE 1394 cable.

Below, a control method of the TV 10 and the image storing system including the TV 10 will be described with reference to FIGS. 2A through 6.

FIGS. 2A, 2B, 3A, 3B and 4 illustrate the UI menu generated by the UI generator 17 according to an exemplary embodiment of the present invention.

Figure 5:
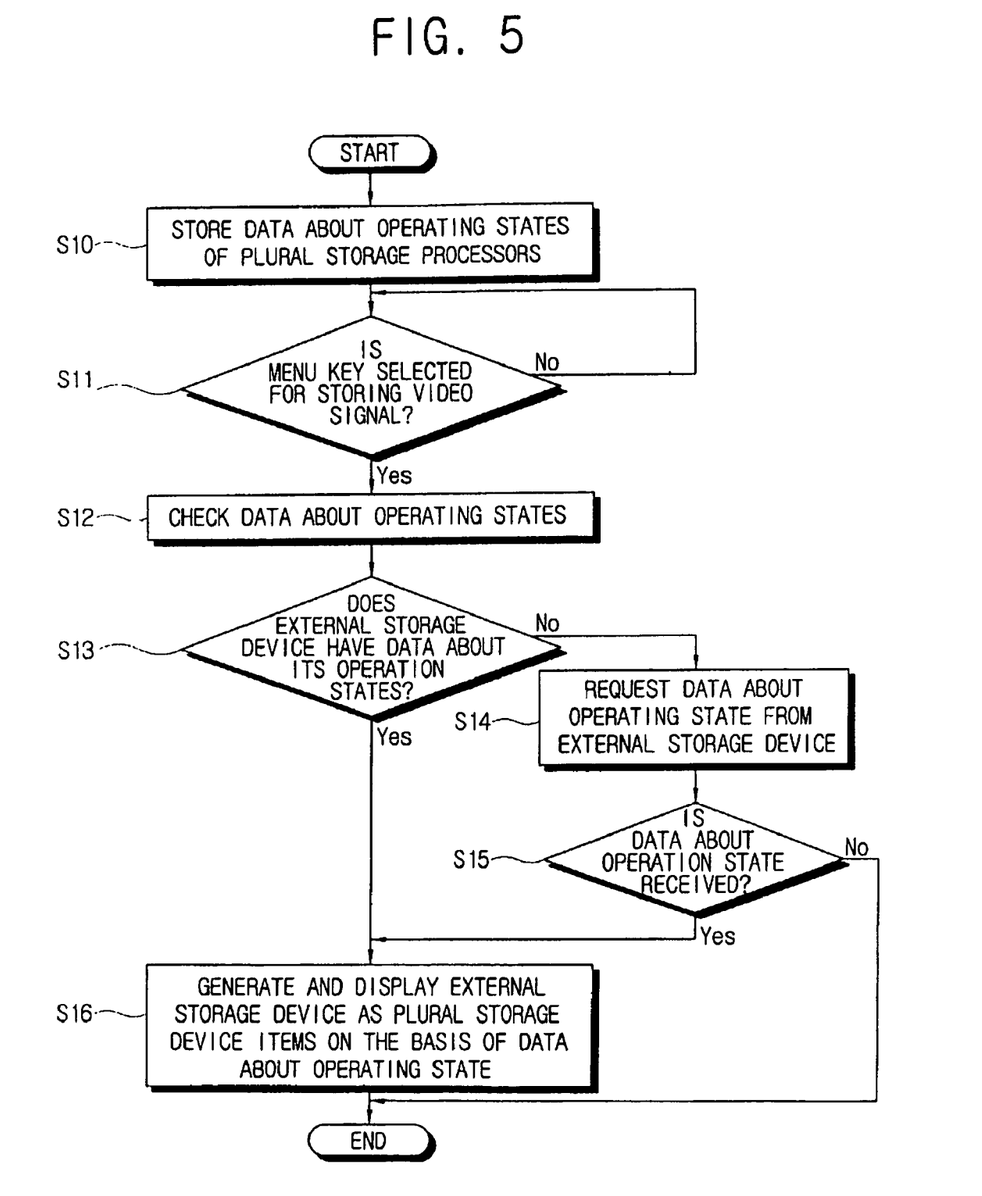
FIGS. 5 and 6 are control flowcharts of the television and the image storing system including the television according to an exemplary embodiment of the present invention.

Referring to FIG. 5, at operation S10, the controller 18 provided in the TV 10 controls the memory 15 to store the data about the operation states of the respective storage processors of the external storage device. Here, the controller 18 determines the current operating states of the storage processors according to whether the video signal processing unit 13 and the communication unit 12 are operated to store the video signal in the external storage device 20. Further, the controller 18 periodically communicates to the external storage device 20, thereby determining the corresponding data about the operating state.

When a user selects the menu key for selecting the external storage device 20 to start or stop storing the video signal from a desired video signal source at operation S11, the controller checks the data about the operating states of the respective processors of the external storage device 20, which is stored in the memory 15, at operation S12.

In the case that there is the data about the operating states of the respective processors of the external storage device 20 at operation S13, the controller 18 controls the UI generator 17 to generate the plurality of storage device items in the UI menu for selecting the external storage device 20, thereby displaying this UI menu on the display unit 14 at operation S16.

Figure 2A:
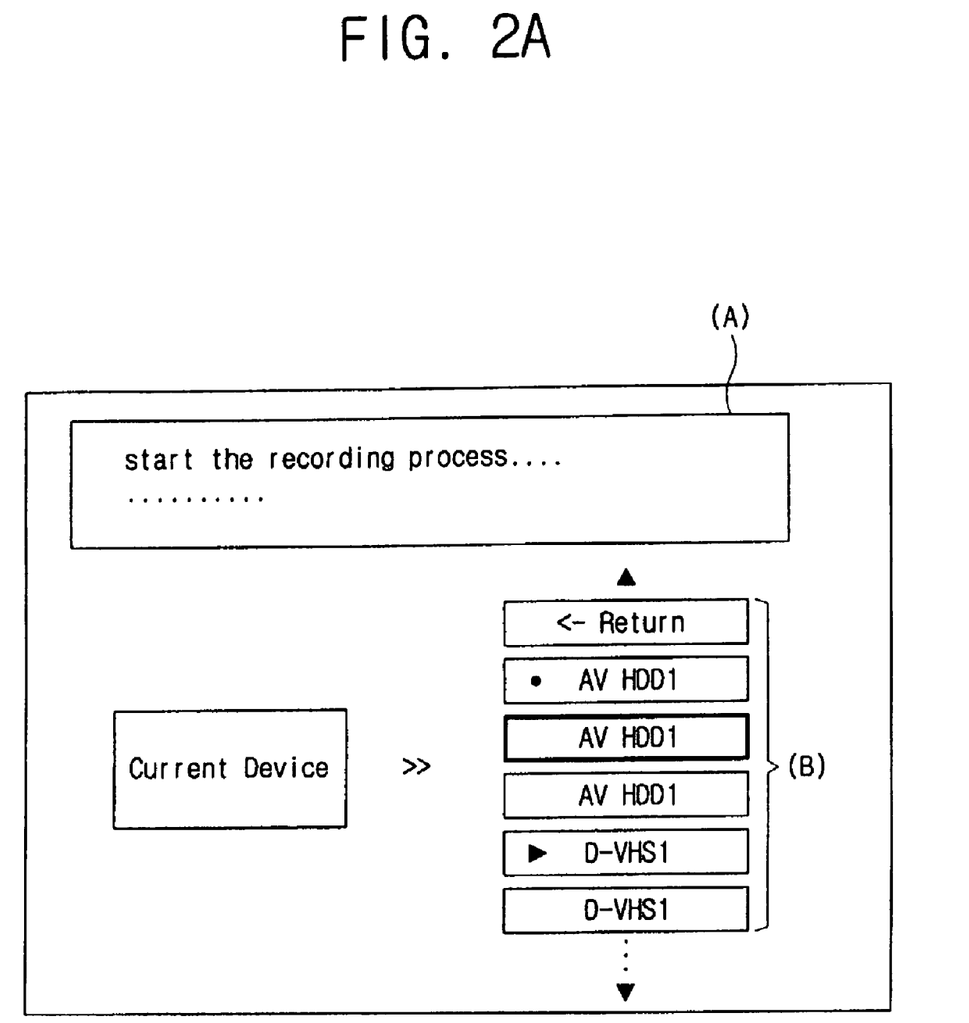
FIGS. 2A, 2B, 3A, 3B and 4 illustrate user interfaces for selecting an external storage device, which are generated by a UI generator according to an exemplary embodiment of the present invention.

FIG. 2A illustrates the UI menu displayed on the display unit 14 by way of example. As shown therein, the external storage device 20 is represented as the plurality of storage device items corresponding to the processors in a "B" region. Referring to the "B" region, the external storage devices 20 connected to the TV 10 include an "AV HDD" and a "D-VHS", in which the "AV HDD" has three processors and the "D-VHS" has two processors. Each item may be displayed with an icon. The icon gives a user information about whether a recording operation is underway or not as well as information about the name of the external storage device 20. Therefore, a user can easily determine the current operating state of each processor of the external storage device 20 by moving a pointing highlight or by checking the icon.

On the other hand, in the case that there is no data about the operating states of the respective processors of the external storage device 20 at operation S13, the controller 18 requests the data about the operation states of the respective processors from the external storage device 20 through the communication unit 12 at operation S14. When the controller 18 receives the data about the operation states of the respective processors from the external storage device 20 at operation S15, the controller 18 controls the UI generator 17 to generate the UI menu representing the external storage device 20 as the plurality of storage device items on the basis of the received data at operation S16.

Figure 6:
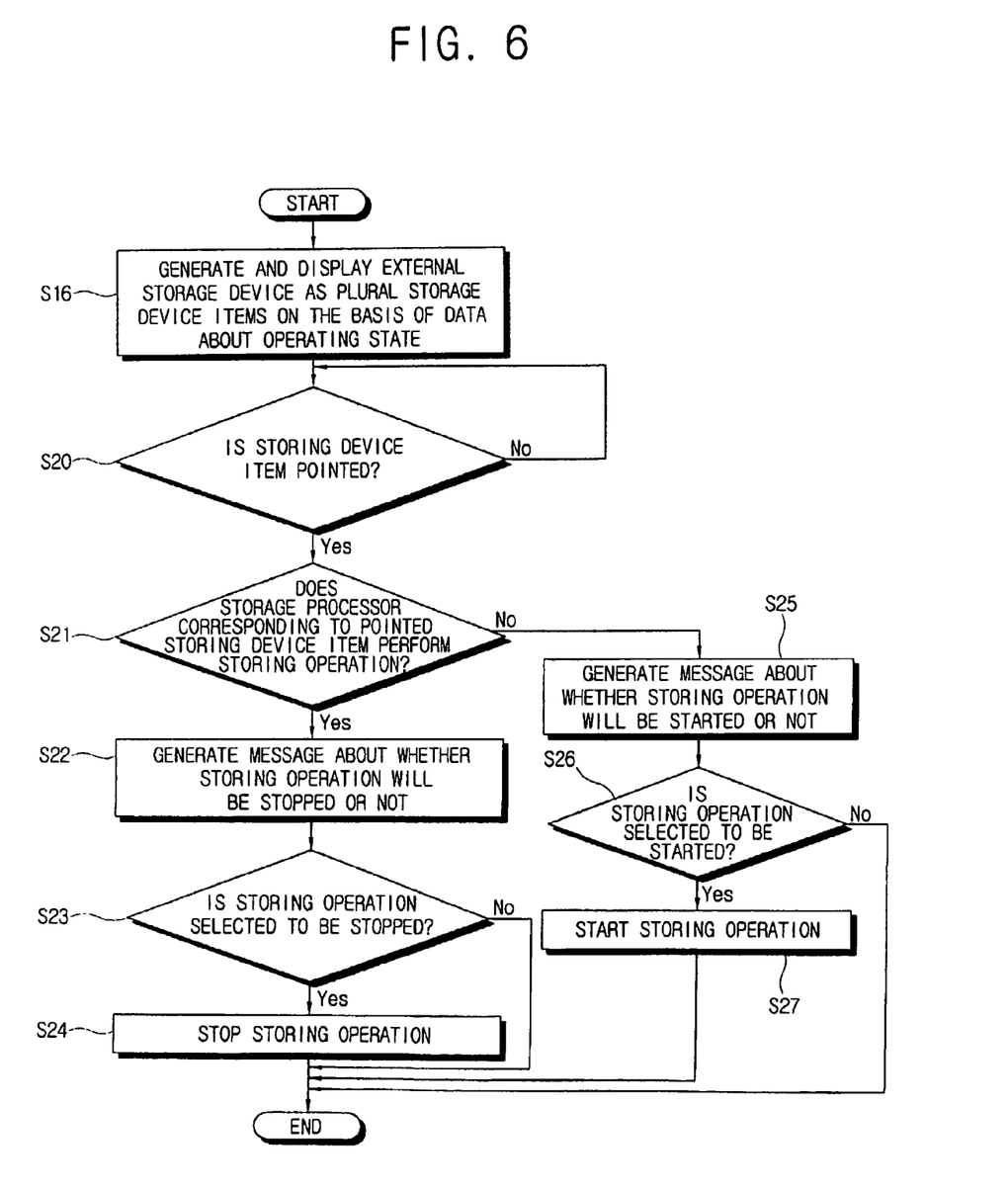

As described above, a user can move the pointing highlight between the storage device items by manipulating the up and down keys of the user selection unit 16. Referring to FIG. 6, when the pointing highlight points a certain storage device item at operation S20, the controller 18 determines whether the storage processor corresponding to the pointed storage device item performs the storing operation, at operation S21.

When the storage processor corresponding to the pointed storage device item does not perform the storing operation at operation S21, the controller 18 controls the UI generator 17 to generate a message asking whether the user wants to start the storing operation, at operation S25.

For example, referring to FIG. 2A, when the pointing highlight points the "AV HDD1" being on standby, the controller 18 controls the UI generator 17 to generate a message of "start the recording process . . . " in an "A" region, at operation S25. Here, the "A" region is used for displaying the text about whether the storing operation is performed or not. Also, the text displayed in the "A" region is varied corresponding to the pointed storage device item every time when the pointing highlight moves and points the storage device items. Thus, while moving the pointing highlight, a user can check the operating state of the pointed storage device item and select the storing operation to be started or stopped.

Figure 2B:
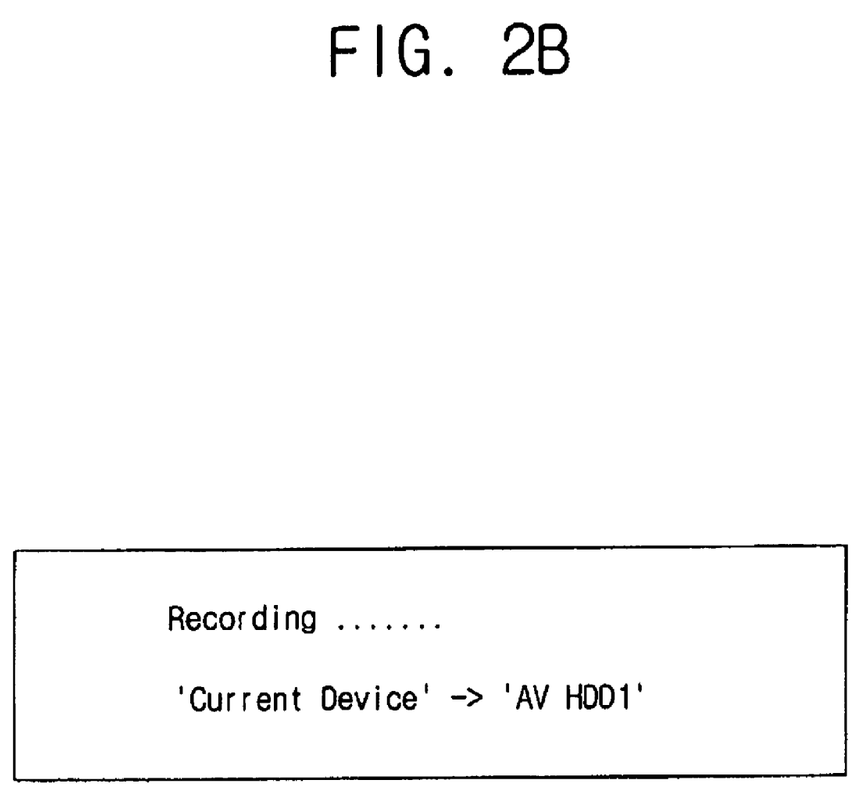

Then, when a user selects the storing operation to be started through the user selection unit 16 at operation S26, as shown in FIG. 2B, the controller 18 controls the currently selected "AV HDD1" to start the storing operation at operation S27, and at the same time controls the UI generator 17 to generate a corresponding message of "recording. . . ". Therefore, a user can check whether the selected operation is performed or not.

On the other hand, when the storage processor corresponding to the pointed storage device item performs the storing operation at operation S21, the controller 18 controls the UI generator 17 to generate a message asking whether the user wants to stop the storing operation, at operation S22.

Figure 3A:
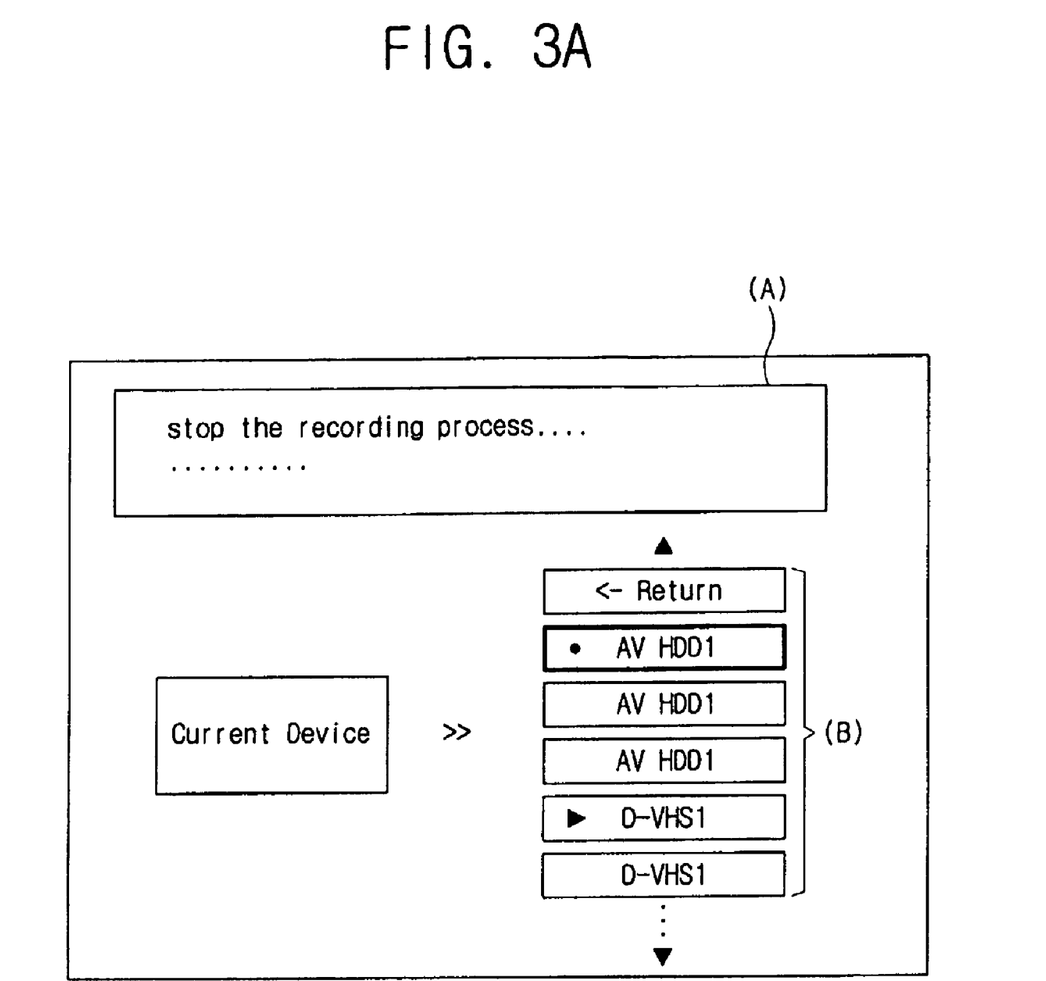

For example, referring to FIG. 3A, when the pointing highlight points the "AV HDD1" performing the storing operation, the controller 18 controls the UI generator 17 to generate a message of "stop the recording process . . . " in the "A" region, at operation S22. When a user selects the storing operation of the pointed storage device item to be stopped at operation S23, the controller 18 stops the storing operation and controls the UI generator 17 to generate the corresponding message, at operation S24.

Figure 3B:
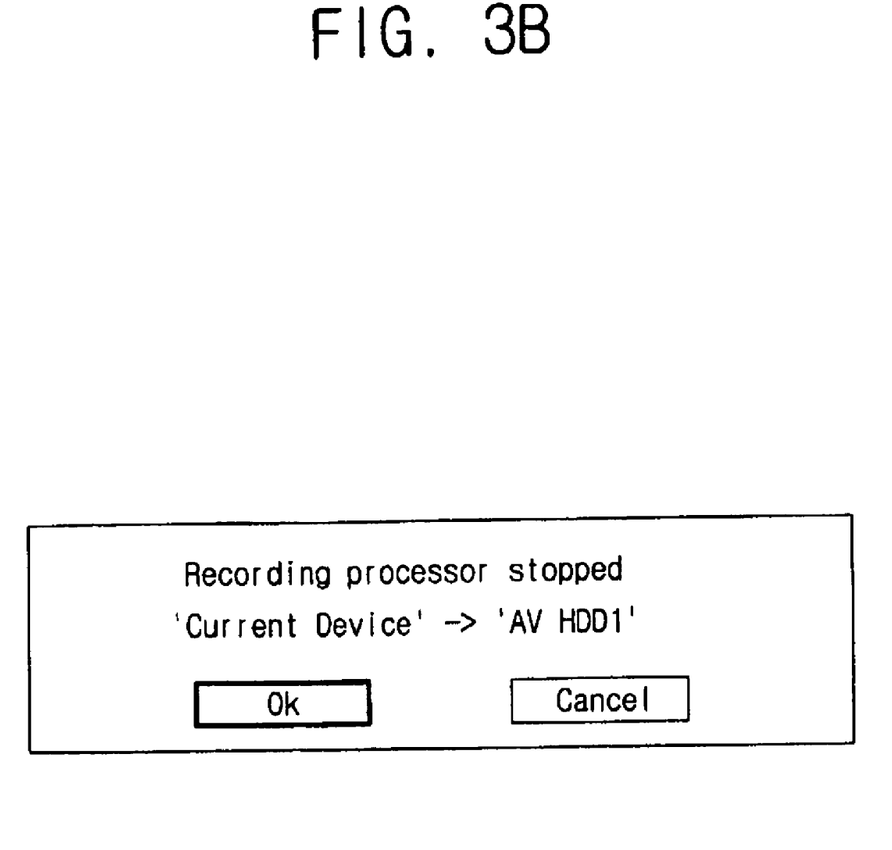

As shown in FIG. 3B, the UI generator 17 can generate the message that the currently pointed "AV HDD1" item is stopped, and can generate an "OK" item and a "Cancel" item along with the message, thereby allowing a user to check whether the storing operation is stopped.

Figure 4:
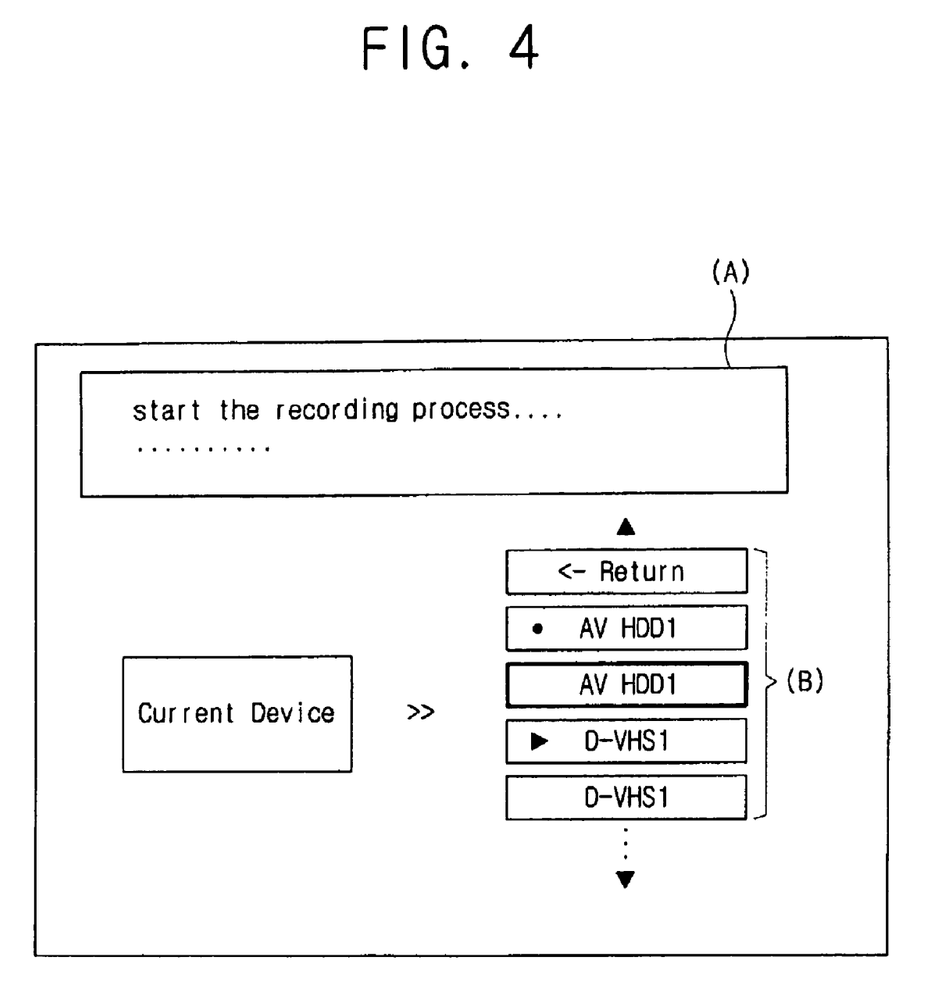

FIGS. 2A through 3B illustrate the external storage device 20 is represented as the plurality of storage device items corresponding to its processors, but the present invention is not limited thereto. Alternatively, the processors performing the storing operation may be represented as the items, respectively, but the other processors being on standby may be represented as one item. For example, as shown in FIG. 4, the processors performing the storing operation, i.e., one processor "AV HDD1" and one processor "D-VHS1" are represented as the storage device items, respectively, but two processors "AV HDD1" which are on standby are represented as one storage device item. Thus, even though a plurality of processors are on standby, a user selects one processor to perform the storing operation, thereby omitting the repetitive items.

In the foregoing exemplary embodiment, the TV 10 is illustrated as an example of an image processing apparatus, but the present invention is not limited thereto. Alternatively, various image processing apparatuses and various external storage devices can be used.

As described above, the present invention provides an image processing apparatus, an image storing system comprising the same and a control method thereof, in which a UI menu for selecting the external storage device having a plurality of storage processors displays each corresponding external storage device as a plurality of storage device items corresponding to its operating states, so that a user can easily select an external storage device to start or stop the storing operation.

Although exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A method of controlling an image storing system comprising at least one external storage device including a plurality of storage processors, and an image processing apparatus connected with the at least one external storage device and storing a received video signal in the at least one external storage device, the method comprising:

storing data about operation states of the plurality of storage processors of the external storage device, wherein the data about the operation states of the plurality of storage processors indicates whether the external storage device is connected to the image processing apparatus and indicates whether each of the plurality of storage processors is performing a recording operation or on standby;

generating a user interface (UI) menu representing one of the at least one external storage device as a plurality of storage device items on the basis of the stored data about the operation states of the plurality of storage processors if a storing operation for the video signal is selected; and generating a message that a storing operation can be started when a storage device item being on standby is pointed by manipulating a user selection unit, and a message that the storing operation can be stopped when the storage device item performing the storing operation is pointed by manipulating the user selection unit, wherein the at least one external storage device is an audio/video (AV) storage device, and wherein the generating the UI menu for selecting the external storage device comprises representing the external storage device as the storage device items corresponding to the storage processors.

2. The method according to claim 1, further comprising requesting the data about the operating states from the external storage device, and receiving the requested data.

3. The method according to claim 1, further comprising starting the storing operation in the case that the storage processor corresponding to the selected storage device item is on standby, and stopping the storing operation in the case that the storage processor corresponding to the selected storage device item performs the storing operation, when the pointed storage device item is selected through the user selection unit.

4. A method of controlling an image processing apparatus to store a received video signal in at least one external storage device including a plurality of storage processors, the method comprising:

storing data about operation states of the plurality of storage processors, wherein the data about the operation states of the plurality of storage processors indicates whether the external storage device is connected to the image processing apparatus and indicates whether each of the plurality of storage processors is performing a recording operation or on standby;

generating a user interface (UI) menu used for selecting the at least one external storage device and representing one of the at least one external storage device as a plurality of storage device items corresponding to the storage processors on the basis of the stored data if a storing operation for the video signal is selected; and generating a message that a storing operation can be started when a storage device item being on standby is pointed by manipulating a user selection unit, and a message that the storing operation can be stopped when the storage device item performing the storing operation is pointed by manipulating the user selection unit, wherein the at least one external storage device is an audio/video (AV) storage device, and wherein the generating the UI menu for selecting the external storage device comprises representing the external storage device as the storage device items corresponding to the storage processors.

5. The method according to claim 4, further comprising requesting and receiving the data about operation states of the plurality of storage processors from the external storage device.

6. An image processing apparatus comprising:

a communication unit which communicates with at least one external storage device including a plurality of storage processors, wherein the at least one external storage device is an audio/video (AV) storage device;

a video signal processing unit which processes a received video signal, and stores the video signal in the external storage device;

a user selection unit;

a memory which stores data about operation states of the plurality of storage processors, wherein the data about the operation states of the plurality of storage processors indicates whether the external storage device is connected to the image processing apparatus and indicates whether each of the plurality of storage processors is performing a recording operation or on standby;

a user interface (UI) generator which generates a UI menu for selecting the external storage device; and a controller which controls the UI generator to generate a UI menu representing one of the at least one external storage device as a plurality of storage device items on the basis of the data stored in the memory if a storing operation for the video signal is selected through the user selection unit and controls the UI generator to generate a message that a storing operation can be started when a storage device item being on standby is pointed by manipulating a user selection unit, and a message that the storing operation can be stopped when the storage device item performing the storing operation is pointed by manipulating the user selection unit, wherein the generating the UI menu for selecting the external storage device comprises representing the external storage device as the storage device items corresponding to the storage processors.

7. The image processing apparatus according to claim 6, wherein the controller starts the storing operation in the case that the storage processor corresponding to the selected storage device item is on standby, and stops the storing operation in the case that the storage processor corresponding to the selected storage device item performs the storing operation, if the pointed storage device item is selected through the user selection unit.

8. The image processing apparatus according to claim 6, wherein the controller requests the data from the external storage device through the communication unit if the memory does not store data about the operating states of the storage processors.

9. The image processing apparatus according to claim 8, wherein the communication unit comprises an IEEE 1394 port.

10. An image storing system comprising:

at least one external storage device including a plurality of storage processors, wherein the at least one external storage device is an audio/video (AV) storage device; and an image processing apparatus which is connected with the at least one external storage device and stores a received video signal in the external storage device, the image processing apparatus comprising:

a communication unit which communicates with the external storage device;

a user selection unit;

a video signal processing unit which processes the video signal;

a memory which stores data about operation states of the plurality of storage processors, wherein the data about the operation states of the plurality of storage processors indicates whether the external storage device is connected to the image processing apparatus and indicates whether each of the plurality of storage processors is performing a recording operation or on standby;

a user interface (UI) generator which generates a UI menu for selecting the external storage device; and a controller which controls the UI generator to generate a UI menu representing one of the at least one external storage device as a plurality of storage device items on the basis of the data stored in the memory if a storing operation for the video signal is selected through the user selection unit and controls the UI generator to generate a message that a storing operation can be started when a storage device item being on standby is pointed by manipulating a user selection unit, and a message that the storing operation can be stopped when the storage device item performing the storing operation is pointed by manipulating the user selection unit, wherein the generating the UI menu for selecting the external storage device comprises representing the external storage device as the storage device items corresponding to the storage processors.

11. The image processing apparatus according to claim 10, wherein the controller requests the data from the external storage device through the communication unit if the memory does not store the data about the operating states of the storage processors.

12. The image processing apparatus according to claim 11, further comprising an IEEE 1394 communication cable which connects the external storage device to the communication unit of the image processing apparatus.

13. The method according to claim 1, wherein the data about the operation states of the plurality of storage processors includes data indicating whether the external storage device is turned on or off.

* * * * *